INVENTOR.
CARL NEITZERT
BY [signature]
ATTORNEY

Nov. 10, 1964 C. NEITZERT 3,156,814

ADJUSTABLE HIGH COUNT MAGNETIC COUNTER

Filed Feb. 1, 1960 6 Sheets-Sheet 2

INVENTOR.
CARL NEITZERT

BY [signature]
ATTORNEY

INVENTOR.
CARL NEITZERT
BY [signature]
ATTORNEY

Nov. 10, 1964 C. NEITZERT 3,156,814

ADJUSTABLE HIGH COUNT MAGNETIC COUNTER

Filed Feb. 1, 1960

6 Sheets-Sheet 4

INVENTOR.
CARL NEITZERT
BY [signature]
ATTORNEY

Nov. 10, 1964 C. NEITZERT 3,156,814

ADJUSTABLE HIGH COUNT MAGNETIC COUNTER

Filed Feb. 1, 1960 6 Sheets-Sheet 5

INVENTOR.
CARL NEITZERT
BY [signature]
ATTORNEY

Nov. 10, 1964 C. NEITZERT 3,156,814

ADJUSTABLE HIGH COUNT MAGNETIC COUNTER

Filed Feb. 1, 1960 6 Sheets-Sheet 6

INVENTOR.
CARL NEITZERT

BY [signature]
ATTORNEY

United States Patent Office 3,156,814
Patented Nov. 10, 1964

3,156,814
ADJUSTABLE HIGH COUNT MAGNETIC COUNTER

Carl Neitzert, Chatham Township, Camden County, N.J., assignor to General Time Corporation, New York, N.Y., a corporation of Delaware Filed Feb. 1, 1960, Ser. No. 9,155
5 Claims. (Cl. 235—92)

This invention relates to counters and more particularly to adjustable high count counters for use in connection with magnetic logic circuitry. Reference is made to my U.S. Patent 2,897,380, which was granted on July 28, 1959, and is entitled "Magnetic Pulse Counting and Forming Circuit" for a disclosure of some of the features which are shown herein. The above identified patent and the subject invention are assigned to the same assignee.

Counters or sequencing devices which control or direct particular circuit functions responsive to the receipt of a given number of input signals are often employed in timing circuits and in logic circuits. While counters may involve a substantial number of electronic or other components which are coupled to provide counting chains, a much simpler device of fewer components results when the counting is done by magnetic cores having substantially square hysteresis loop characteristics. Moreover, such magnetic cores have inherent advantages since they relay upon the characteristics of core material which are very uniform and stable over a long lifetime. These characteristics may be utilized to provide an extremely wide range of uniform output signals of selected polarity at any rate from 18,000 pulses per second to one pulse per day with an accuracy which varies by less than one-one hundredth of a percent, to provide precise timing, to retain a previous count after power is removed, to count at any speed up to about 100,000 pulses per second, and to withsand extremely high vibration, shock and acceleration forces. Such performance standards are frequently necessary to satisfy the exacting requirements, for example, of remotely-controllable navigational and timing systems, particulary where minimal size and weight are also needed.

However, magnetic counters which have been developed in the past have not adequately exploited these inherent adavntages primarily because magnetic cores are driven into saturation responsive to the receipt of a number of pulses which is fixed by the number of turns tha are wound about such cores and by the energizing current flow. If it is necessary to provide output signals responsive to a different number of input pulses, it has been necessary either to accept cascaded counters which have large gaps of unobtainable capacity or to provide very complicated subtracter or scaler circuits which require a substantial amount of relatively heavy and expensive equipment. Neither of these alternatives is desirable. Furthermore, added counter circuitry may be unacceptable if it introduces variables detracting from the optimum performance aavilable from magnetic core devices.

Accordingly, it is an object of my invention to provide new and improved counting circuits utilizing the properties of magnetic cores having square hysteresis loop characteristics.

Another object of the invention is to provide saturable core pulse forming and counting stages of increased flexibility and versatility. In this respect, it is an object to form output signals having uniform characteristics responsive to the receipt of any number of input signals. Still another object is to provide such devices in a form which makes them simple and convenient to operate in cascade without undesired reaction or complicated isolation means. Yet another object is to provide counters which combine addition and multiplication processes to provide maximum capacity with a minimum of components.

Other objects and advantages of the invention will appear in the following description taken along with the accompanying drawings in which.

Figure 1:
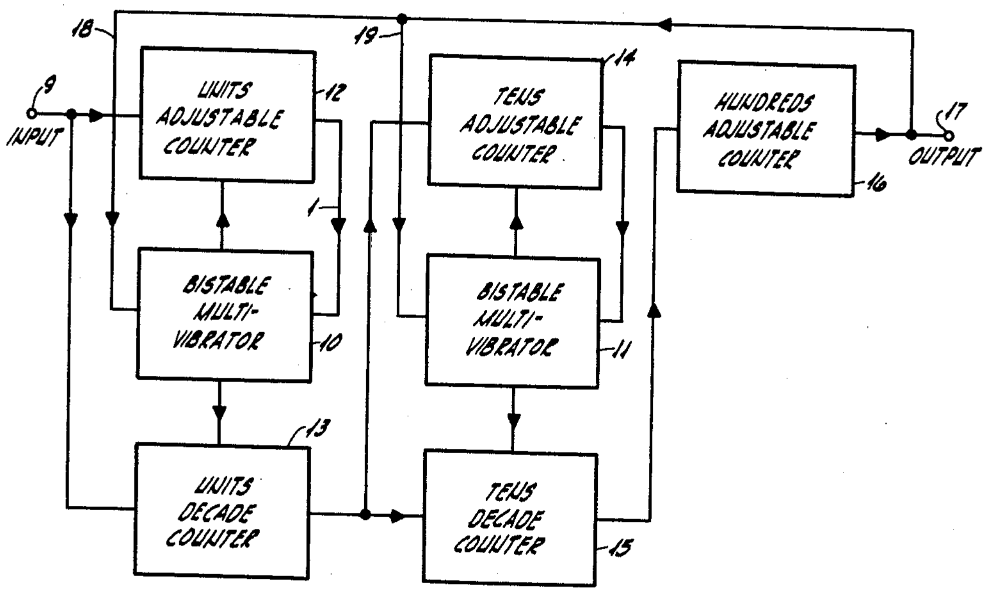
FIGURE 1 is a block diagram showing three stages of magnetic counters connected to provide an adjustable output count.

While the invention is susceptible of various modifications and alternative constructions, there is shown in the drawings and will herein be described in detail certain preferred embodiments. It is to be understood that it is not thereby intended to limit the invention to the particular forms disclosed, but it is on the other hand intended to cover all modifications, equivalents, and alternative constructions falling within the spirit and scope of the invention as expressed in the appended claims.

Turning now to FIGURE 1, principles of the invention are generally illustrated in connection with the block diagram representation of basic component counters each adapted to produce an output pulse after any preselected number of input pulses or signals have been counted. More particularly, any suitable driving source (not shown) applies cyclically recurring pulses of uniform volt-second content to input terminal 9. Two bistable multivibrators or flip-flop steering circuits 10 and 11 are provided to direct input signals to either an adjustable counter or a fixed decade counter depending upon the number of pulses that have been received previously. That is, a specific number of input pulses are counted by units adjustable counter 12 in accordance with a units setting. Then a decade or ten step units counter 13 produces a ten signal each time that ten pulses are received thereafter. In a similar manner, a specific number of tens signals are counted by tens adjustable counter 14 in accordance with a tens setting. Then a decade or ten step counter 15 produces a hundreds signal each time that one hundred input pulses are received thereafter. By adding similar stages, any number of input pulses may be counted. FIG. 1 shows only three stages and therefore it can count any number up to the number 999.

As a specific example of the function of the counter, let it be assumed that the counter of FIG. 1 is adjusted to provide an output pulse after the receipt of "473" input pulses at input terminal 9. That is, a switch associated with units counter 12 is set to indicate the number "3;" a switch associated with tens counter 14 is set to indicate the number "7;" and a switch associated with hundreds counter 16 is set to indicate the number "4." Three input pulses are received at terminal 9, recorded in counter 12, and multivibrator 10 is flipped to its second state so that all input pulses are thereafter directed to units decade counter 13. For each ten additional input pulses received in the units decade counter 13, a pulse is transmitted to the adjustable tens counter 14. The first pulse into the tens stage indicates the receipt of thirteen—rather than ten—input pulses. After ten more input pulses, adjustable tens counter 14 is advanced to indicate the receipt of twenty-three input pulses. In a similar manner, tens counter 14 is advanced each time that units decade counter 13 counts ten pulses. On its seventh pulse or step, after the receipt of seventy-three input pulses at input terminal 9, counter 14 trips multivibrator 11 and the output of units decade counter 13 is effectively connected to the input of tens decade counter 15. When ten more input pulses are received at terminal 9, counter 13 produces an output pulse and trips tens decade counter 15. Thus, the first pulse that is recorded in counter 15 indicates the receipt of eighty-three input pulses. Every tenth pulse which is received thereafter at input terminal 9 causes units decade counter 13 to pulse tens decade counter 15. After counter 15 has advanced ten steps, it produces an output signal which drives hundreds counter 16. Thus, the first pulse which is applied to counter 16 occurs after the receipt of one hundred and seventy-three input pulses. Thereafter, units decade counter 13 counts every input pulse, tens decade counter 15 counts every tenth pulse, and hundreds adjustable counter 16 counts every hundredth pulse until it reaches its fourth and final step after the receipt of four hundred and seventy-three input pulses.

A single output pulse occurs only after the counter of FIG. 1 receives a predetermined number of input pulses or signals. Responsive thereto, succeeding equipment is energized via terminal 17 and multivibrators 10 and 11 are reset via conductors 18 and 19. The output pulse may also perform whatever further output function is desired.

Figure 2B:
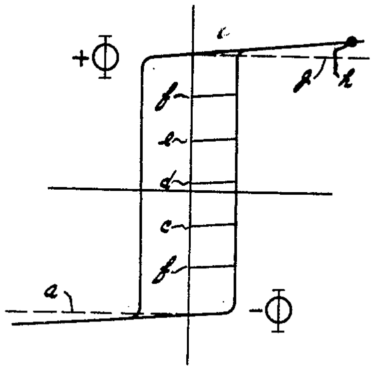
FIG. 2B is a graph showing the hysteresis loop of the cores that are used in connection with the magnetic counters which are shown elsewhere in the drawings.
Figure 2A:
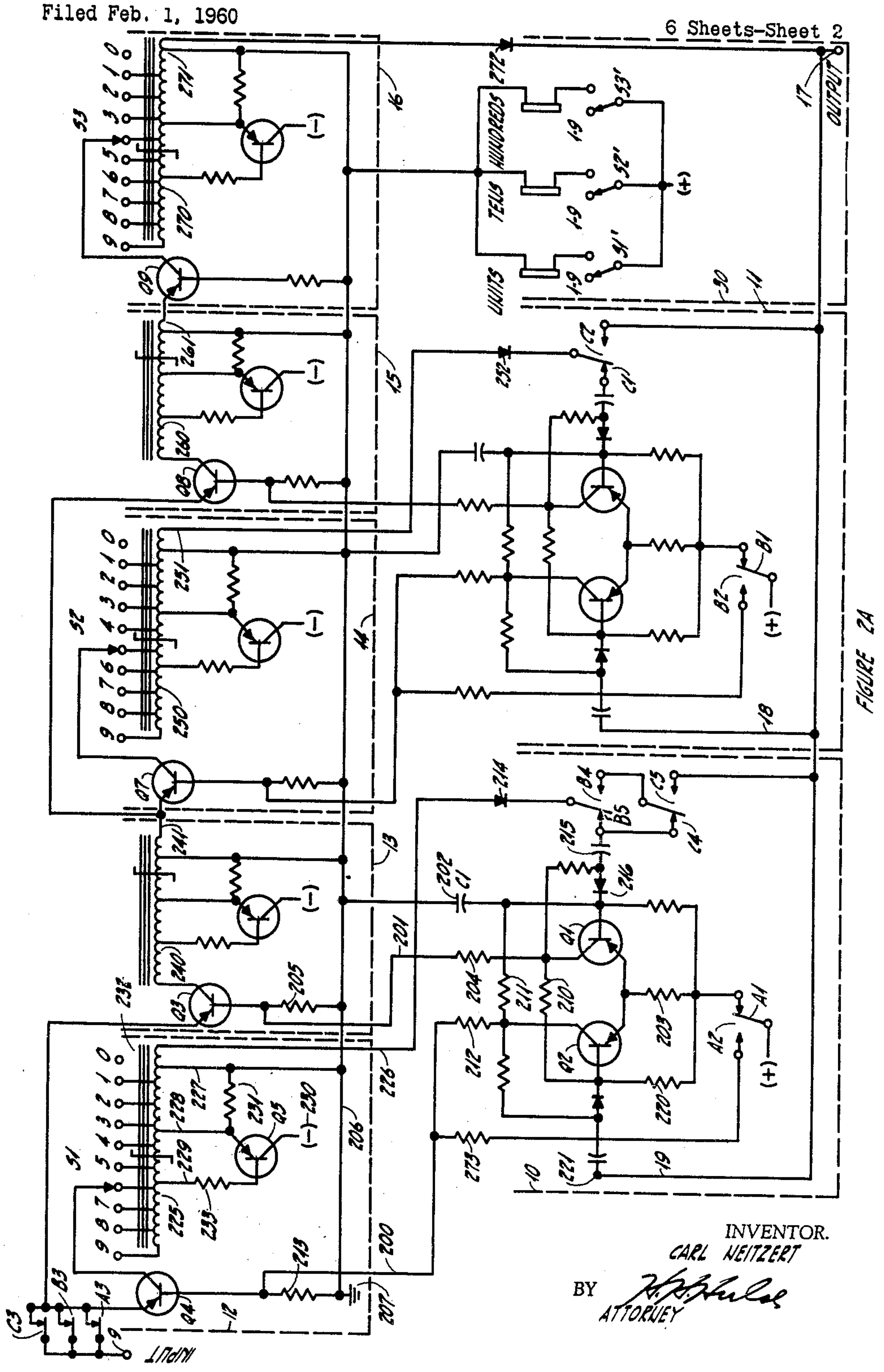
FIG. 2A is a schematic diagram which shows the details of the circuit that completes the blocks which are shown in FIG. 1.

Turning next to FIG. 2A, there is shown a schematic diagram of a circuit which may be used to complete the blocks of FIG. 1. The major component circuits include transistorized bistable multivibrator circuits 10 and 11, adjustable counters 12, 14 and 16, fixed decade counters 13 and 15, and zero adjustment switch 30.

For a detailed description of the multivibrator, reference is made to block 10 in FIG. 2A. The device as shown has two stable states which are hereinafter called "state A" and "state B." When in state A, transistor Q1 conducts and transistor Q2 is cut-off. When in state B, transistor Q2 conducts and transistor Q1 is cut-off. Hence multivibrator 10 is a switching device having two output terminals 200 and 201 which may be energized separately, but never simultaneously.

Upon energization of the multivibrator of circuit 10, the charge on capacitor 202 keeps the base of transistor Q1 at ground potential briefly (i.e., less positive than the base of transistor Q2) and current flows from a positive potential terminal (+) through contacts A1, resistance 203, transistor Q1, resistance 204, conductor 201, resistance 205 and bus 206 to ground 207. Current flowing through transistor Q1 and resistance 204 biases the base of transistor Q3 above ground potential to an off condition. Current also flows from transistor Q1 through resistance 210 to bias transistor Q2 to an off condition. The small current which flows in the voltage divider circuit extending from positive battery through contacts A1, resistance 203, the emitter and base of transistor Q1, resistances 211, 212, and 213 to ground 207 does not interfere with the conductivity of transistor Q4.

To switch multivibrator 10 to state B, after a predetermined number of input pulses or signals are received at terminal 9, counter 12 produces an output pulse, as will be explained below. Responsive thereto, a pulse is applied through diode 214, contacts B5, capacitor 215, and diode 216 to the base of transistor Q1 which is made more positive thereby. Transistor Q1 is turned off. A voltage divider including resistances 205, 204, 210, and 220 makes the base of transistor Q2 more negative than the emitter thereof to render transistor Q2 conductive. Thus, in state A, multivibrator 10 applies a blocking potential over conductor 201 to render gating transistor Q3 non-conductive. Further, in state B, multivibrator 10 applies a blocking potential to conductor 200, thus rendering gating transistor Q4 non-conductive while removing the blocking potential from conductor 201 to render transistor Q3 conductive.

To reset multivibrator circuit 10, a positive pulse is applied to terminal 221 thereby turning off transistor Q2 by making the base more positive than the emitter thereof. Transistor Q1 turns on thereafter.

The magnetic counter illustrated by blocks 12–16 includes means for applying a magnetic bias which is shown in counter 12 as a single winding 225 turned about a toroidal core 232. Preferably winding 225 is a continuous winding having a plurality of taps or terminals which are brought out for external connection. When energized by current flowing in a first direction the winding forms a circuit for biasing core 232 toward positive magnetic saturation. A selector switch S1 is arranged to connect with any one of the select taps 0–9 to select the number of turns which are energized and thus the number of pulses which are to be counted. When the winding is energized by current flow in a second direction, an output winding is formed by the turns between taps 226 and 227. A second group of turns which are between taps 227 and 228 forms a resetting winding, while a third group of turns which are between taps 228 and 229 form a control circuit that initiates a resetting cycle.

In greater detail, an application of input signals to the turns between the select tap which is selected by switch S1 and tap 227 provides a saturation current flow which drives the associated core 232 from a negative to and beyond a positive level of magnetic saturation in a volt-second product corresponding to the integration of a selected number of uniform input pulses (six pulses when switch S1 is set as shown in FIG. 2A).

In operation, the manner in which magnetic counter 12 functions may be understood by making reference to FIG. 2B which shows the hysteresis loop of core 232 that is associated with winding 225. When core 232 is reset to negative magnetic saturation, the magnetic flux is at level "*a*." Assuming that switch S1 connects with the sixth tap of winding 225 as shown in counter 12, the first input pulse or signal which is received at terminal 9 drives the magnetic flux from level "*a*" to point "*b*" as shown in FIG. 2B. In a similar manner, each of the next four pulses drives the core flux to points "*c*" to "*f*" respectively. After the receipt of five and a fraction input pulses, the core material is driven into positive magnetic saturation, level "*g*" on the curve of FIG. 2B. During the remainder of the sixth pulse occurring after saturation, current flow in winding 225, slightly increases the core flux by a rising magnetic characteristic which is graphically illustrated in FIG. 2B by the curve extending from the level of positive magnetic saturation "*g*" to an extended point "*h*."

To reset the counter at the end of the sixth pulse, after saturation current in winding 225 drops to zero, the core flux decays or drops abruptly from point "*h*" to positive magnetic saturation at level "*g*." The decaying magnetic flux which is so produced induces a negative pulse in the control turns between taps 228 and 229 which is utilized to trigger a resetting switch in the form of transistor Q5, as will be explained below.

Returning briefly to the counting period, the base electrode of resetting switch Q5 is connected as the control electrode, preferably through a current-limiting and temperature-compensating resistance 233 to tap 229 on winding 225. During the counting period when saturation or magnetizing current flows through winding 225 to ground, base tap 229 is more positive than emitter tap 228 and transistor Q5 is turned off. Thus, the flow of resetting current through the emitter-collector circuit of transistor Q5 is blocked.

The automatic operation of resetting transistor Q5 to start and stop the flow of resetting current follows the saturation current flow during the last of the counted pulses. Stated another way, core 232 is automatically reset each time that the saturation winding is deenergized after the core has been driven to and beyond magnetic saturation. For example, referring to FIG. 2B, a voltage of reverse polarity is induced upon termination of the saturating current by the small flux decay as explained above, i.e., magnetic flux falls from point "h" to level "g" as indicated in FIG. 2B. Responsive thereto, emitter tap 228 momentarily becomes positive with respect to base tap 229 and transistor Q5 is switched on. Current flows from source 230 through transistor Q5 and the resetting turns of winding 225 in a direction which biases the core 232 toward negative magnetic saturation. The circuit values are such that the current flowing through the reset turns between taps 227 and 228 is sufficient to drive core 232 to negative magnetic saturation (level "a" in FIG. 2B) before an application of the next input pulse or signal.

An output pulse appears at terminal 226 due to the voltage that is induced in the output turns between taps 227 and 226 by the flux change which occurs as the core 232 is driven from positive to negative magnetic saturation. During the resetting cycle, the voltage induced across the control winding between taps 228 and 229 makes the base of transistor Q5 negative with respect to the emitter thereof, thus keeping transistor Q5 switched on. However, when core 232 is driven into negative magnetic saturation, the voltage induced across the control winding approaches zero and transistor Q5 turns off, thus ending the flow of resetting current.

For a further description of the basic magnetic counter circuit, reference is made to previously mentioned Patent No. 2,897,380.

In accordance with this invetnion, the component circuits which have been described above are interconnected to provide an adjustable, multi-stage, high count counter, as shown in FIG. 2A, in which addition and multiplication processes are combined to provide maximum flexibility with a minimum number of components. Each of the adjustable counters 12, 14 and 16 produces an output pulse after adding a preselected number of input signals. If switch S1 in counter 12 is set on terminal six, an appearance of an output pulse at terminal 226 indicates the receipt of six input pulses. On the other hand, series connected fixed-count counters 13 and 15 cooperate to produce an output pulse after multiplying a predetermined number of input signals. Thus, after ten input signals are counted by counter 13, counter 15 is tripped to indicate the product "ten" (10×1). After ten more pulses are counted by counter 13, counter 15 is tripped to indicate the product "twenty" (10×2). The total capacity of counters 13 and 15 equals the product "one hundred" (10×10).

In greater detail, it is assumed initially that multivibrators 10 and 11 are in state A and that all magnetic counter cores are pre-set to negative magnetic saturation. The ouptut from multivibrator 10 is fed over conductor 201 to block gate transistor Q3. Substantially no current flows over conductor 200; therefore, gate transistor Q4 is conductive. Input signals in the form of positive pulses each having a specified volt-second area are applied to input terminal 9 by any suitable driving source (not shown). Responsive to each signal that is received, the emitter of gate transistor Q4 is made more positive than the base thereof and current flows from terminal 9 through transistor Q4 and the saturation turns of winding 225 which are between taps "6" and 227 to ground on bus 206. After six pulses are received core 232 which is associated with winding 225 is biased into positive magnetic saturation. At the end of the sixth pulse, decaying magnetic flux turns on resetting transistor Q5, triggers a resetting cycle, and applies a positive output pulse at terminal 226 (as explained above).

To transfer from units adjustable counter 12 to units decade counter 13, multivibrator 10 is triggered to state B when the positive pulse appearing at tap 226 is passed through diode 214, capacitor 215, and diode 216 to the base of transistor Q1 which turns off thereby turning on transistor Q2. Responsive thereto, the output of transistor Q2 is connected via conductor 200 to the base of transistor Q4 thereby biasing it to an off condition. When transistor Q1 turns off, the blocking potential is removed from conductor 201 and transistor Q3 is rendered conductive to pass input signals appearing at terminal 9, thus biasing an associated core toward positive magnetic saturation.

Pulses ar signals continue to be generated by the driving source (not shown) which is connected to input terminal 9. Each input pulse is conducted through the emitter-collector circuit of transistor Q3 to energize winding 240. Since transistor Q3 is connected to energize the entire length of winding 240, ten input pulses must be received before the core associated therewith is snapped into positive magnetic saturation. Responsive thereto, an output pulse appears at tap 241. It should be noted that six pulses were required to produce an output pulse at tap 226 and that ten additional pulses were required to produce an output signal at tap 241; therefore, the first pulse which is applied to tens adjustable counter 14 indicates the receipt of sixteen—not ten—input pulses. However, each of the input pulses which follows is applied through transistor Q3 to winding 240; therefore, each output pulse, after the first, appearing at tap 241 indicates the receipt of ten pulses from the driving source.

Means are provided for driving an adjustable tens counter to record the occurrence of a predetermined number of tens pulses. Since multivibrator 11 is in state A, transistor Q7 is biased to conductivity and transistor Q8 biased to nonconductivity. Thus, each pulse which appears at output tap 241 of winding 240 is conducted through transistor Q7 to energize winding 250. Since selector switch S2 is connected with terminal 5, units decade counter 13 must deliver five output pulses to saturate the core associated with winding 250. As explained above, five pulses are delivered from tap 241 to transistor Q7 responsive to the receipt of fifty-six input pulses at terminal 9.

To transfer from tens adjustable counter 14 to tens decade counter 15, an energizing pulse is transmitted from tap 251 to multivibrator 11 via diode 252. When multivibrator 11 is changed to state B, a blocking potential is applied to the base of transistor Q7, thus rendering it nonconductive, and a blocking potential is removed from the base of transistor Q8 thus rendering it conductive. Thereafter, an output pulse is delivered from output tap 241 to tens decade counter winding 260 via transistor Q8, each time that ten pulses are received at input terminal 9. Thus, the first pulse that is delivered to winding 260 represents the receipt of sixty-six input pulses at terminal 9.

To switch to the adjustable hundreds counter, after winding 260 is pulsed ten times, a core associated therewith is driven into positive magnetic saturation and a signal is transmitted from output terminal 261 through transistor Q9 to pulse winding 270.

Means are provided for delivering an output pulse from the counter to a succeeding circuit after the receipt of a predetermined number of input pulses or signals. That is, in view of the setting of switch S3, winding 270 drives an associated magnetic core into and beyond a state of positive magnetic saturation responsive to the receipt of four input pulses from tens decade counter 15. Responsive to decaying magnetic flux after the end of the fourth pulse which energizes winding 270, an output pulse is generated at terminal 271. The output pulse is transmitted through diode 272 to output terminal 17 and further is extended over conductors 18 and 19 to reset each of the multivibrators 10 and 11 to its state A.

In recapitulation, adjustable units counter 12 counted six pulses, tens counter 14 counted fifty (5×10) pulses and hundreds counter 16 counted four hundred $$(4\times10\times10)$$

pulses. The output signal at terminal 17 occurred after four-hundred-fifty-six pulses were received at input terminal 9. A different number of pulses is counted if switches S1, S2 and S3 are set in contact with different select taps.

Next to be described is the manner in which the circuit functions when any of the switches S1, S2 or S3 is set to a zero position. More particularly, associated with each of the ten-position switches, there is the bank (S1, S2 and S3) which is used for selecting a particular tap on the associated winding. In addition, each switch includes a second bank, identified as S1', S2', and S3'. The first nine terminals in each of the second banks complete no circuits; however, when any switch is set to zero, an obvious circuit is completed through the second bank to operate an associated relay.

To provide a zero units count, switch S1 is set in the zero position, thereby energizing relay A over an obvious circuit. Responsive to the energization of relay A, contacts A1 open, thereby removing the positive potential which initially drives multivibrator 10 to its state A. Contacts A2 close to extend a positive potential through resistance 273 to the base electrode of gate transistor Q4 which is blocked thereby. Since multivibrator 10 is not energized, no signal is transmitted over conductor 201, and the base of transistor Q3 is negative with respect to the emitter thereof when positive pulses are applied to input terminal 9; hence, gate transistor Q3 is conductive. Contacts A3 open one circuit at the input terminal 9 without effect at this time. Each input signal received at terminal 9 is applied through gate transistor Q3 to energize winding 240; hence, an output pulse is generated at terminal 241 responsive to the receipt of ten input pulses, thereby making the units count zero.

A tens zero count is provided in a similar manner when switch S2' is set at a zero terminal and tens relay B is energized in an obvious manner. Responsive thereto, contacts B1 open, thus preventing an energization of multivibrator 11. Contacts B2 close to apply a positive blocking potential to the base of transistor Q7. Therefore, each positive output pulse which is delivered from units decade counter 13 makes the emitter of gate transistor Q8 more positive than the base thereof, thus energizing winding 260. A signal is transmitted from counter 15 to hundreds counter 16 after ten signals have been delivered from unit counter 13 to tens decade counter 15. Therefore, the tens count is zero. Also responsive to operation of relay B, contact B3 opens one point in the input circuit without effect at this time. Contacts B4 close and B5 open to place the trigger circuit of multivibrator 10 under the control of relay C. If it is assumed that relay C is unoperated at this time, there is no practical effect.

Next it is assumed that the hundreds switch S3' is set to zero to operate relay C. Responsive thereto, contacts C1 open so that multivibrator 11 does not switch to state B when adjustable tens counter 14 produces an output signal at terminal 251. Contacts C2 close so that the output pulse which appears at terminal 251 of the tens counter is applied through diode 252 to output terminal 17, there being no output signal from hundreds counter 16 when switch S3' is set to zero.

If both the tens and hundreds switches S2' and S3' are set at zero, contacts B5 and C4 are open; therefore, multivibrator 10 does not switch to state B and input signals are applied only to winding 225. Moreover, contacts B4 and C5 are closed so that each output signal appearing at terminal 226 is conveyed through diode 214 to output terminal 17, there being no output signal from tens and hundreds counters 14 and 16 when switches S2' and S3' are set at zero. Diodes 214, 252 and 272 isolate the various outputs to keep the signals that are applied to terminal 17 from feeding back into the outputs of the various stages.

When all three switches S1', S2' and S3' are set at a zero position all three relays A, B and C operate. Responsive thereto, contacts A3, B3 and C3 open to disconnect input terminal 9 from the counter of FIG. 2A and no output signal appears.

Figure 3B:
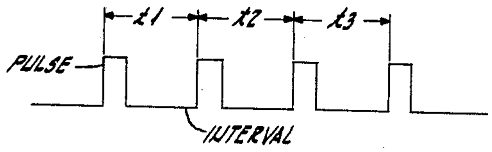
FIG. 3B is a graph or curve which illustrates the count cycle of FIG. 3A.
Figure 3A:
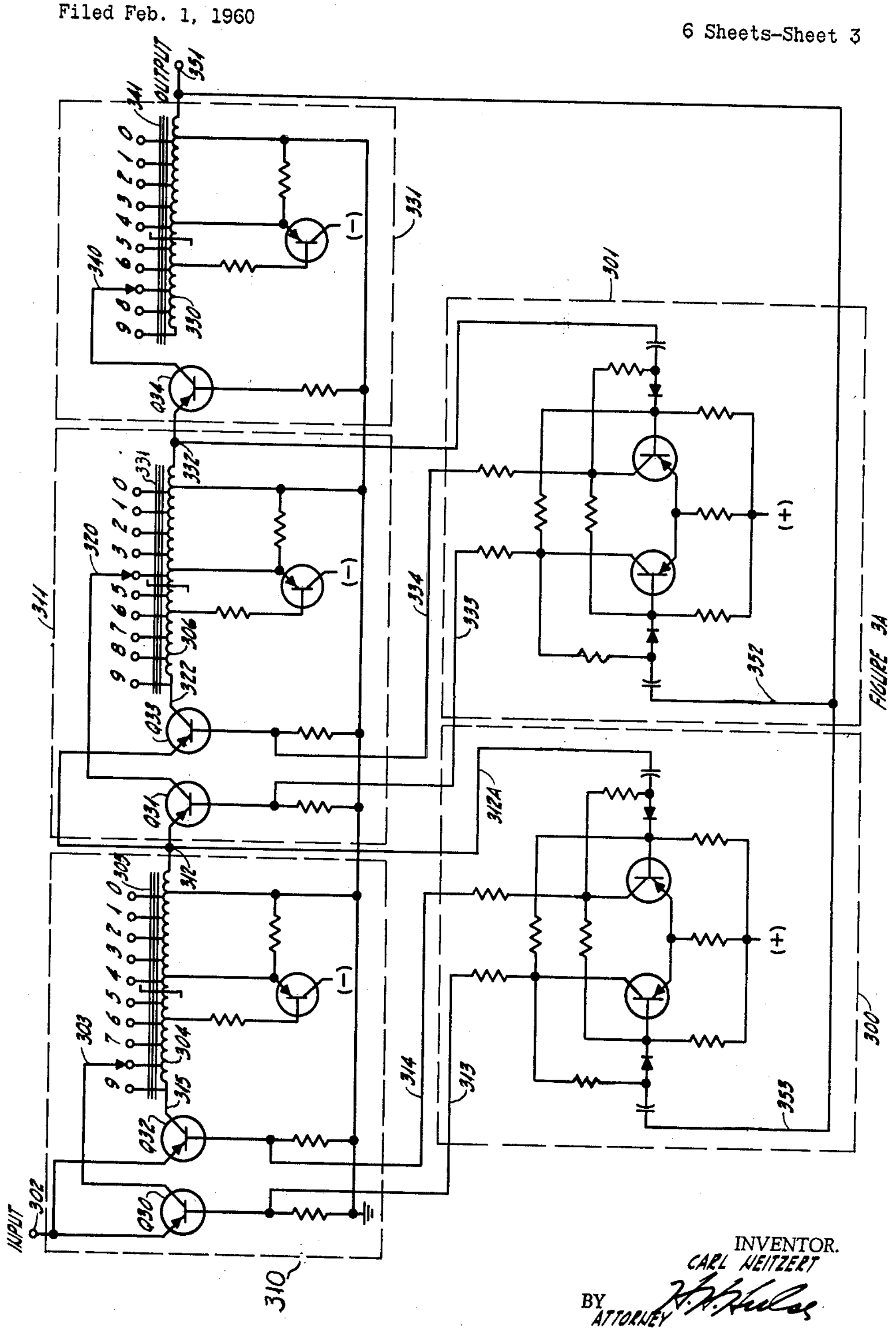
FIG. 3A is a schematic diagram which shows a modified or alternative circuit that may be used in place of the circuit of FIG. 2A.

In accordance with another aspect of the invention, the number of magnetic counters may be reduced by approximately fifty percent when the circuit is arranged as shown in FIG. 3A. Each winding is provided with a select tap and a fixed tap. If a winding is energized via the select tap, an associated core is driven into a given level of magnetic saturation responsive to the receipt of a number of input signals which is preselected by the setting of an associated switch. On the other hand, if the winding is energized via the fixed tap, the associated core is driven into the given level of magnetic saturation responsive to the receipt of a fixed number of input signals.

In the embodiment of FIG. 3A, the dial or scale of the various switches must be numbered or otherwise indexed to accommodate a difference in the count cycle. For an illustration of this problem, see FIG. 3B. Each time period, indicated by the letter "*t*," includes a pulse when current flows through input terminal 302 (FIG. 3A) and an interval when no current flows. Thus, three time periods *t1*, *t2* and *t3* are defined by four pulse periods; hence, a count of four pulses indicates the occurrence of only three time periods so that the count must be reduced by one unit. Further to illustrate the problem, consider the reasons why the years 1900–1999 are known as the Twentieth Century, i.e. twenty "century" years have passed when the year 1901 is reached; thus, the century count must be reduced by one to indicate the number of time periods which have passed.

Except as explained above, the circuit of FIG. 3A functions in a manner which is similar to that described above in connection with the circuit of FIG. 2A.

In greater detail, let it be assumed that multivibrators 300 and 301 (FIG. 3A) are in state A so that gating transistors Q30 and Q31 are rendered conductive while gating transistors Q32 and Q33 are rendered nonconductive. Therefore, input signals appearing at terminal 302 are applied through conductive transistor Q30 to a select tap on winding 304 via switch 303. Since switch 303 engages the eighth select tap, core 305 is driven into and beyond positive magnetic saturation after the receipt of nine input signals, for reasons explained above in connection with FIG. 3B. Responsive thereto, core 305 is reset to negative magnetic saturation and an output signal is delivered from terminal 312 through transistor Q31 and switch 320 to a select tap on winding 306.

One difference between the operation of the circuit of FIG. 2A and the operation of the circuit of FIG. 3A should be noted at this time. That is, in FIG. 2A no pulse is delivered to tens counter 14 until after ten additional input pulses have driven units decade counter 13 through ten steps. Therefore, the first pulse which is delivered into tens counter 14 represents the receipt of sixteen input pulses which are received at terminal 9 when switch S1 is standing on terminal 6. Contrast this with the functioning of the circuit of FIG. 3A where nine pulses are received at terminal 302, applied through conductive gate transistor Q30 to winding 304, and an output pulse is delivered from units counter 310 to tens counter 311 when switch 303 is standing on terminal 8. Thus, it is seen that the tens counter 311 in FIG. 3A completes its count ten input pulses sooner than tens counter 15 of FIG. 2A completes its count when the cores of both counters are energized via windings having the same number of turns.

To transfer from an adjustable unit count to a fixed unit count, multivibrator or bistable circuit 300 is tripped when an output pulse is delivered from terminal 312 over conductor 312*a* responsive to the saturation of core 305. The output of multivibrator 300 is now switched from conductor 314 and to conductor 313 thereby blocking gate transistor Q30 and unblocking gate transistor Q32. Since transistor Q32 is conductive, each input signal appearing at terminal 302 is applied to fixed tap 315 on winding 304. Therefore, ten additional input signals are required again to drive core 305 into and beyond the level of positive magnetic saturation.

Tens counter 311 advances one step responsive to the receipt of each ten input signals which appear at terminals 302.

More particularly, an output signal appears at terminal 312 each time that winding 304 receives ten energizing pulses via fixed tap 315. Since select switch 320 engages its fourth terminal, core 321 is driven to and beyond positive magnetic saturation responsive to the receipt of five input pulses which are extended from terminal 312 through transistor Q31. Responsive thereto, multivibrator 301 is tripped, core 321 is reset to negative magnetic saturation, and an output pulse appears at terminal 332. The five pulses appearing at terminal 312 reprsent the receipt of forty-nine input pulses at input terminal 302.

A difference between the functioning of the circuits which are shown in FIGS. 2A and 3B, is again noted. The output signal from adjustable tens counter 14 (FIG. 2A) trips multivibrator 11—not hundreds counter 16. In the circuit of FIG. 3A, output of adjustable tens counter 311 (i.e. when transistor Q31 is conductive) steps hundreds counter 331. Therefore, in the circuit of FIG. 3A, hundreds counter 331 reaches capacity sooner than hundreds counter 16 of FIG. 2A reaches capacity when both hundreds counters are energized via windings having the same number of turns.

Tens counter 311 is switched from an adjustable to a fixed count cycle when multivibrator 301 is tripped (as explained above) to remove a blocking potential from conductor 334 and to apply a blocking potential to conductor 333. Since transistor Q31 is now non-conductive and transistor Q33 is now conductive, all signals appearing at terminal 312 drive core 321 via fixed tap 322. Responsive to each ten pulses appearing at terminal 312, an output pulse appears at terminal 332; or, stated another way, responsive to each hundred input signals received at terminal 302, an output pulse appears at terminal 332.

Adjustable hundreds counter 331 is driven through a count cycle responsive to input signals which continue to appear at terminal 302. That is, every tenth input signal appearing at terminal 302 produces an output signal at terminal 312, and every tenth signal appearing at terminal 312 produces an output signal at terminal 332, thereby energizing hundreds counter winding 330 via transistor Q34. After eight pulses are applied to energize winding 330, core 341 is biased to and beyond magnetic saturation. Responsive thereto, core 341 is reset to negative magnetic saturation, an output signal appears at terminal 351 and multivibrators 300 and 301 are reset to state A via conductors 352 and 353.

Briefly in resumé, the counter of FIG. 3A is madeup of units, tens, and hundreds counting stages, each including an adjustable counter with the units and tens stages also including a fixed counter. However, each stage in the counter circuit of FIG. 3A produces one additional output pulse, as explained above when the differences between the circuits of FIGS. 2A and 3A were noted. In addition, there is the extra pulse which was noted above when FIG. 3B was described. To compensate for these extra pulses, the dial markings or other indices associated with switches 303, 320, and 340 are changed to indicate the actual count.

Zero settings in the embodiment of FIG. 3 will be explained next. If units select switch 303 is moved to the zero terminal, core 305 is driven into positive magnetic saturation responsive to the receipt of one input signal and a single output pulse occurs at terminal 312 when the input pulse ends. If tens switch 320 is not at its zero setting, the circuit functions as described above when units counter 310 is switched from its adjustable to its fixed count. On the other hand, if tens switch 320 is standing on its zero terminal, winding 306 is energized by the single pulse appearing at terminal 312, thereby driving core 321 into and beyond positive magnetic saturation. In a similar manner, if hundreds switch 340 is standing on any terminal other than zero, the circuit functions as described above after completion of the adjustable tens count. However, if switch 340 is standing on its zero terminal, winding 330 is energized by the single pulse that appears at terminal 332 and core 341 is driven into and beyond positive magnetic saturation; therefore, an output pulse appears at terminal 351.

If all switches are set at zero, each associated counter delivers an output pulse immediately after the receipt of a single input pulse. This is equivalent to the transmission of a single pulse through the entire counter with a delay at each stage which is equal to the width of such pulse. The delay is important to insure proper switching of the multivibrators. For example, let it be assumed that switch 340 is standing on its zero terminal. After tens counter core 321 is driven into and beyond positive magnetic saturation, an output signal appears at tens output terminal 332, the leading edge of which switches multivibrator 301 to state B. Thereafter, hundreds core 341 saturates and an output signal appears at hundreds output terminal 351, the leading edge of which is applied over conductor 352 to switch multivibrator 301 back to state A. The delay or time period between the occurrence of a pulse at tens terminal 332 and a pulse at hundreds terminal 351 allows time enough for all transients to die out. Without the delay period, it is possible that transients resulting from the pulse appearing at tens terminal 332 might switch multivibrator 301 back to state B after the pulse appearing at hundreds terminal 351 has switched it to state A. In fact, it is conceivable that multivibrator 301 might switch back and forth several times while all transients are dying away.

Figure 4:
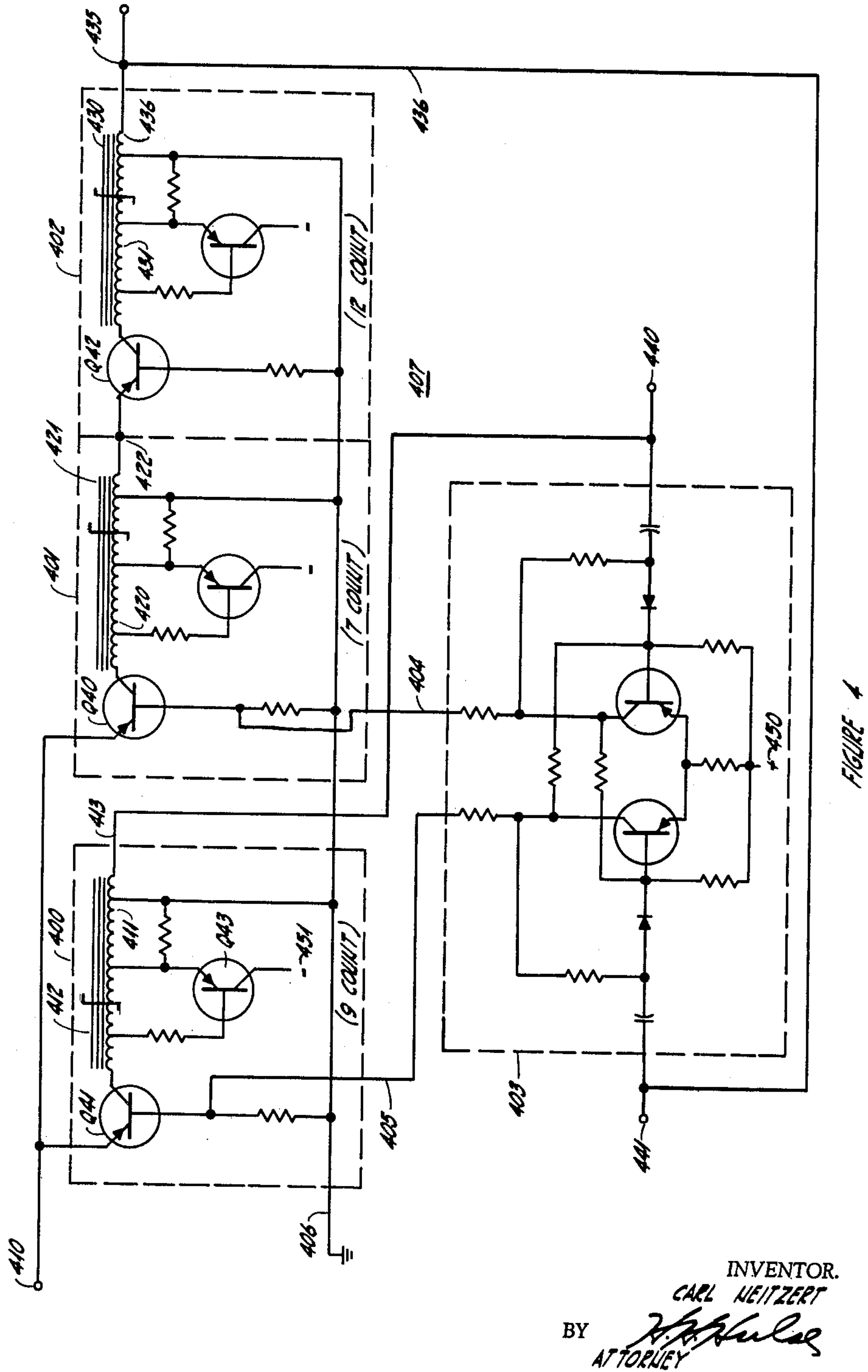
FIG. 4 shows a counter including a first stage which is additively connected and second stage which is connected in cascade to provide a counting chain.

Thus far, the invention has been described in connection with counters making use of a combination of addition and multiplication processes wherein one multiplication factor is the number "ten," e.g. counters 13, 15, 311 and 331 always count in multiples of ten. However, the invention contemplates the use of other multiplication factors, also. For example, FIG. 4 shows an addition core 412 and two series connected multiplication cores 421 and 430, none of which counts ten pulses. For the purposes of this description, it is assumed that core 412 is driven to and beyond positive magnetic saturation responsive to the receipt of nine input signals appearing at terminal 410. It is also assumed that core 421 is driven to and beyond positive magnetic saturation responsive to the receipt of seven input signals at terminal 410 and that core 430 is driven to and beyond positive magnetic saturation responsive to the receipt of 12 pulses at terminal 422.

At the start of a count cycle, multivibrator 403 is in state A whereby a blocking potential is applied over conductor 404 to block transistor Q40 and no blocking potential is applied over conductor 405; therefore, only gate transistor Q41 is conductive. Hence, each input signal which appears at terminal 410 is applied through transistor Q41 to energize winding 411.

After the receipt of nine input signals at terminal 410 and the consequential energization of winding 411, core 412 is driven to and beyond positive magnetic saturation, thereby producing an output pulse which is applied over conductor 413 to switch multivibrator 403 to state B to cause an addition of nine input signals. When multivibrator 403 is in state B, the blocking potential that was formerly applied to conductor 404 is removed and a blocking potential is applied over conductor 405 to block gate transistor Q41. Gate transistor Q40 is now conductive and all input pulses appearing at terminal 410 are applied to energize winding 420.

A multiplication process is used to count the next eighty-four input pulses that are received at terminal 410. That is, each of the next seven input pulses energizes winding 420. At the end of the seventh pulse, an output signal appears at terminal 422, and core 421 automatically resets to negative magnetic saturation, as explained above. One pulse is now stored in core 430, to indicate the receipt of 16 input signals at terminal 410, i.e. nine input signals drove addition counter 400 into magnetic saturation and the next seven input signals drove multiplication counter 401 into magnetic saturation; hence, the count is now $(9+(7\times1))$ or sixteen. Every seventh input signal appearing at terminal 410 causes winding 431 to be pulsed once. After 12 such pulses, an output signal appears at termial 435, thereby energizing the succeeding circuit and resetting multivibrator 403 over conductor 436. Thus, the signal at terminal 435 indicates a count of $(9+(7\times12))$ or a total of ninety-three input pulses.

It should be understood that the circuitry of FIG. 4 is shown by way of example only and that other addition and multiplication stages may isntead be incorporated. For example, the single core of stage 400 may be replaced by a pair of cores which are series connected to provide a multiplication stage such as stage 407. Further, let it be assumed that the first of the two series connected counters which replace counter 400 is adapted to count five input signals and that the second is adapted to count thirteen input signals. An output signal is applied to conductor 413 after the receipt of sixty-five $(5\times13)$ input pulses. Responsive thereto, multivibrator 403 is switched to state B. An additional eighty-four $(7\times12)$ input pulses are required to drive counters 401 and 402. Hence, the appearance of an output pulse at terminal 435 occurs after the receipt of a hundred forty-nine $(5\times13)+(7\times12)$ input pulses.

Other modifications of the circuit that is shown in FIG. 4 may include extra magnetic counters which are connected in tandem. For example, if counter 400 is replaced by a two stage counter, each stage of which counts eight pulses, and further if counter 407 is replaced by a three stage counter, each stage of which counts ten pulses, there is an increased capacity whereby a total of one thousand, sixty-four pulses are counted, i.e. $(8\times8)+(10\times10\times10)$. Thus, any number which can be factored can be counted by a single multiplication stage and any number which can not be factored can be broken down into two or more factorable numbers which may be added together. Each factorable number is counted on a multiplication stage, and the products of all multiplication stages are added together.

To provide "off" and "on" control, yet another modification of the counter of FIG. 4 contemplates the elimination of counter 400 and the connection of conductor 405 to ground bus 406. Input signals may or may not appear on terminal 410 at this time; however, the counter of FIG. 4 does nothing until a start pulse is applied to terminal 440, thereby flipping multivibrator 403 from state A to state B, and removing the blocking potential from conductor 404 to render gating transistor Q40 conductive. Thereafter, counter 401 counts each input signal as it is received at terminal 410. Assuming that counter 401 counts seven input signals and that counter 402 counts twelve input signals, an output pulse appears at terminal 435 after the receipt of eighty-four input signals at terminal 410. Multivibrator 403 is then switched to state A via conductor 436 and nothing further happens until another start pulse is received at terminal 440, thereby flipping multivibrator 403 to state B a second time. If conductor 436 is removed multivibrator 403 may be switched responsive to pulses applied at terminals 440 and 441, thus providing a counter which may be turned "off" and "on" by independently generated "off" and "on" pulses.

Figure 5:
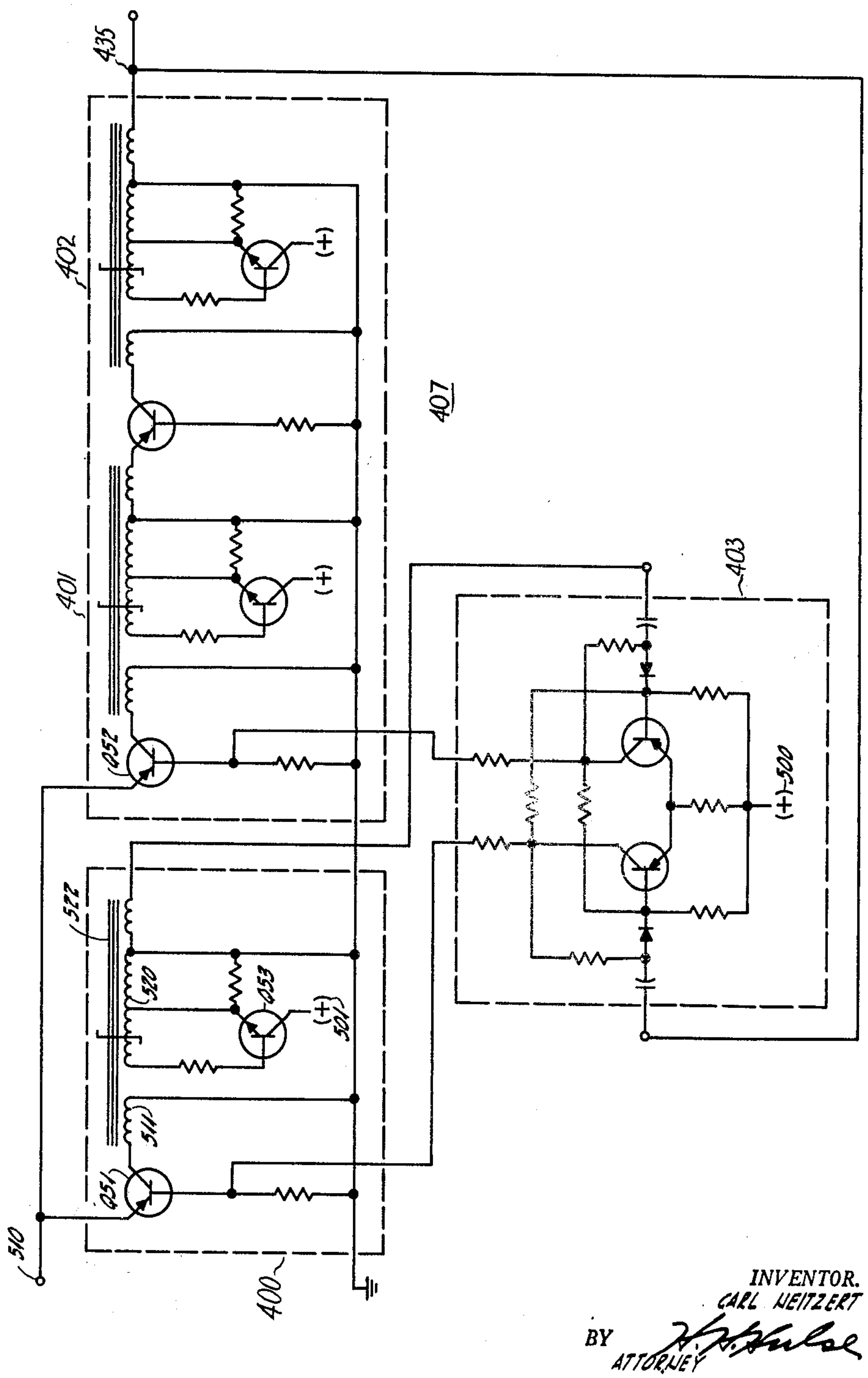
FIG. 5 shows a modification of the counter that is shown in FIG. 4.

A further modification of the counting circuit is shown by FIG. 5 which eliminates the need for the negative battery voltage, thus accommodating certain connecting circuits. For the circuit that is shown in FIG. 5, it is assumed that positive input signals are applied to input terminal 510—just as positive input signals are applied in the circuits that are shown in other figures. Therefore, all circuits include the same P–N–P gating transistors, such as transistor Q51, for example. Responsive to the receipt of each input signal of positive polarity, the emitter of gating transistor Q51 is made more positive than the base thereof, thus rendering it conductive and causing current to flow through associated saturating or magnetizing winding 511. The number of turns in input winding 511 determines the number of input signals which must be received at terminal 510 before the associated core is driven into and beyond positive magnetic saturation.

For electrically isolating but magnetically coupling windings 520 and 511, separate turns are wound about core 522. The sense of winding 520 is reversed from that of previously described windings to maintain the same output polarity despite change of battery polarity and the sense of winding 511, relative to winding 520 is reversed because the polarity of the input pulse is unchanged but that of the resetting voltage is reversed. Therefore, after winding 511 is de-energized, a resetting cycle and an output pulse is triggered responsive to decaying magnetic flux, as explained above in connection with the counters that are used in the other figures. See my above identified Patent 2,897,380 for greater detail. Since windings 511 and 520 are electrically isolated, an N–P–N resetting transistor Q53 may be used to control the resetting cycle. Because an N–P–N transistor is rendered conductive when its base its made positive relative to its emitter and negative relative to its collector, potential 501 may be of positive polarity (i.e. the same as potential 500). On the other hand, since a P–N–P transistor such as Q43 (FIG. 4) is rendered conductive when its base is negative relative to its emitter and positive relative to its collector, potential 451 must be negative (i.e. opposite to potential 450). Therefore, it is seen that the circuit of FIG. 5 needs only one battery; whereas, the circuit of FIG. 4 needs two batteries. Except for the changes noted above, the circuits of FIGS. 4 and 5 are the same.

Quite obviously, negative input signals as well as negative biasing potentials may be accommodated by the selection of transistors of proper polarities.

Figure 6:
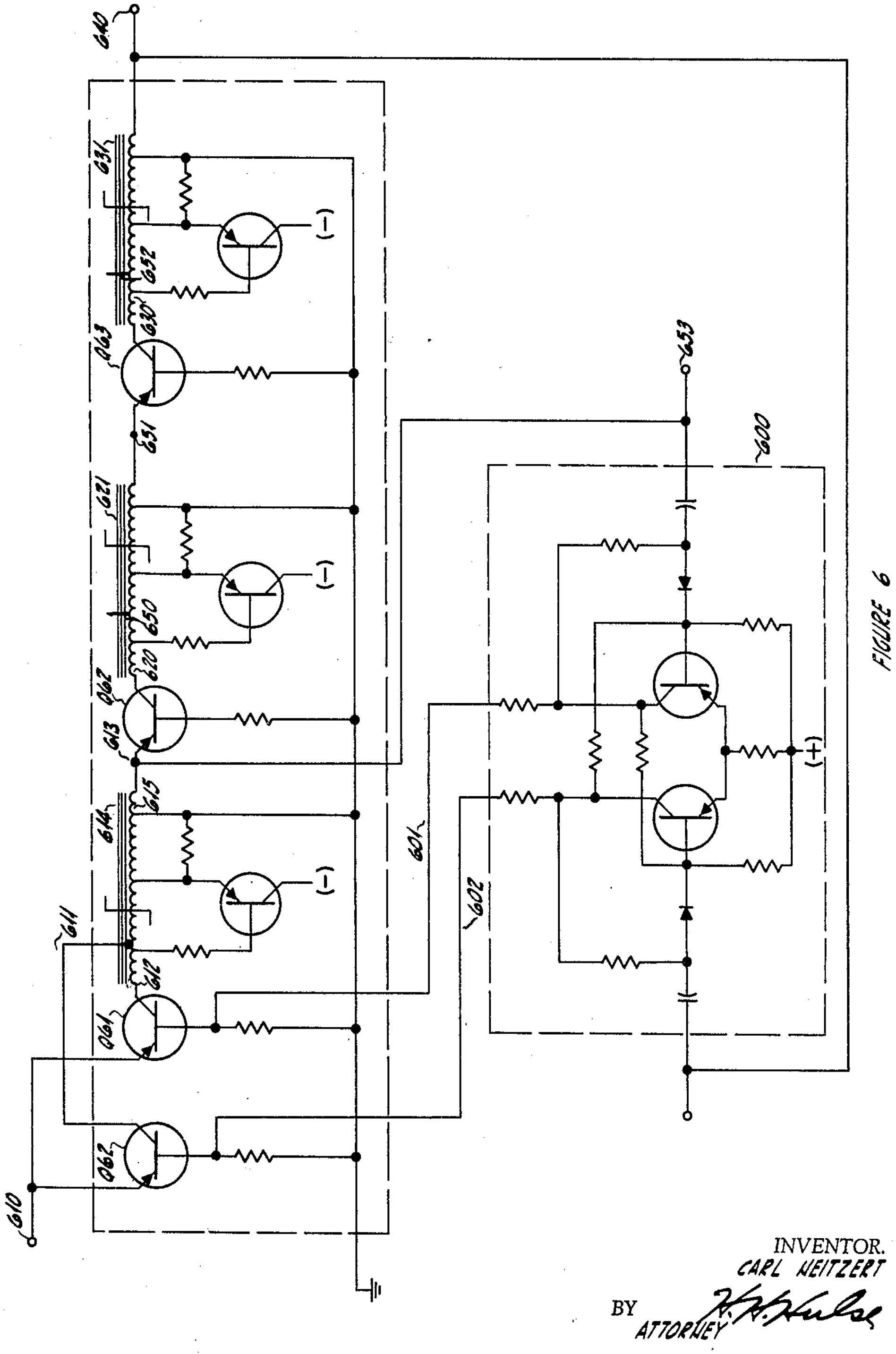
FIG. 6 is a schematic diagram which shows an embodiment that combines the general principles of the invention to provide a simplified circuit.

In accordance with yet another feature of this invention, an adjustable counter may be provided as shown in FIG. 6. From the foregoing description, it will be apparent that, in state A, multivibrator 600 applies a blocking potential to conductor 601 for rendering gating transistor Q61 non-conductive. Further, in state B, multivibrator 600 applies a blocking potential to conductor 602, thus rendering gating transistor Q62 non-conductive while removing the blocking potential from conductor 601 to render transistor Q61 conductive. Thus, input signals appearing at terminal 610 may be applied either through transistor Q62 to a select tap 611 or through transistor Q61 to a fixed tap 612, under the control of multivibrator 600. As will also be apparent from the foregoing description, multivibrator 600 is normally in state A when counting starts and is switched to state B responsive to the magnetic saturation of core 614.

The circuit of FIG. 6 is different from the circuits that are shown in the other figures because the collector of gating transistor Q62 may be connected to any of the select taps 611, 650, or 652 (or other similar taps if a plurality of taps are provided for each winding) and further because the invention contemplates connecting multivibrator switching terminal 653 to any of the output terminals 613, 651, or 640. In this manner, the circuit of FIG. 6 may be adjusted to count any of many different numbers of input signals before producing an output signal.

More particularly, let it be assumed that each of the magnetic cores in FIG. 6 counts ten input signals when energized through transistors Q61, Q62, or Q63, as the case may be. Further let it be assumed that core 614 counts three input signals when winding 615 is energized via select tap 611, that core 621 counts four input signals when winding 620 is energized through select tap 650, and further that core 631 counts five input signals when energized via select tap 652. It should also be noted that the actual count of the circuit of FIG. 6 may be less than the number of pulses that are received for reasons which are described above in connection with FIGS. 3A and 3B; however, to simplify the following description, no reference is made to such extra pulses—the references being to the desired count, per se.

With the circuit conected as shown in FIG. 6, an output pulse is produced at terminal 640 after nine hundred and ninety-three input signals have been counted. That is, the first pulses are transmitted through gate transistor Q62 to select terminal 611 and core 614 is saturated on a desired count of three. Responsive thereto, core 614 is reset, multivibrator 600 is switched to state B, and winding 620 is pulsed once. Thereafter, incoming input signals are applied from terminal 610 through transistor Q61 to fixed tap 612. This time core 614 is saturated responsive to a count of ten input signals and winding 620 is pulsed a second time. So far, thirteen input signals have been counted. After eighty additional signals are counted, core 621 is driven into positive magnetic saturation to produce an output pulse at terminal 651. After nine hundred additional signals are counted, core 631 is saturated and an output pulse appears at terminal 640 thus resetting multivibrator 600 and energizing a succeeding circuit.

To change the count of the device that is shown in FIG. 6, switching terminal 653 may be disconnected from terminal 613 and connected either to terminal 651 or to terminal 640. Thus, an initial count may be a multiplication or product count. In a similar manner, the collector of transistor Q62 may be disconnected from select tap 611 and connected either to select tap 650 or to select tap 652, thus causing a different first count. For a specific illustration, consider the count when the collector of transistor Q62 is connected to select tap 650 and switching terminal 653 is connected to terminal 651. The first group of signals appearing at terminal 610 saturates core 621 on a desired count of four, trips multivibrator 600, and pulses winding 630. After a count of nine hundred additional signals which are applied through transistor Q61, an output signal appears at terminal 640. That is, a total of nine hundred and four pulses have been counted. By connecting the collector of transistor Q62 to a proper select tap and the switching terminal 653 to a proper output terminal, any one of a number of counts may be selected. Again, it is noted that the foregoing description of FIG. 6 refers to the actual or desired count and does not refer to the number of input signals that are received.

Quite obviously, counting stages may be added to or eliminated from the device of FIG. 6, or any of the other figures, as required.

I claim as my invention:

1. In a counter capable of being set to produce an output pulse upon receipt of a predetermined high number of input pulses, the combination comprising a unit adjustable counter, a tens adjustable counter and a hundreds adjustable counter, each of said counters being of the type having a saturable element capable of achieving the condition of saturation upon receipt of a limited but predetermined and adjustable number of input pulses accompanied by production of an output pulse with automatic resetting to the initial state, a units decade counter and a tens decade counter of the type having a saturable element capable of achieving saturation upon receipt of ten input pulses accompanied by production of an output pulse with automatic resetting to the initial state, means including an input terminal for receiving a train of input pulses, an output terminal, means including a first two-condition switch interposed between the units adjustable counter and the units decade counter for connecting such counters alternatively to the input terminal and so that when the number of pulses is received for which the units adjustable counter has been set the units adjustable counter is disabled and the units decade counter is enabled to receive pulses from the input terminal, means including a second two-condition switch interposed between the tens adjustable counter and the tens decade counter so that the tens adjustable counter receives an input signal from the units decade counter until the number of pulses is received for which the tens adjustable counter has been set following which the second two-condition switch disables the tens adjustable counter and enables the tens decade counter to receive pulses from the units decade counter, said hundreds adjustable counter being connected between the tens decade counter and the output terminal so that a signal is produced at the output terminal when the set count is reached therein.

2. In a counter capable of being set to produce an output pulse upon receipt of a predetermined high number of input pulses, the combination comprising an input terminal and an output terminal, a series of adjustable counters corresponding to the successive orders of a decimal number from low order to high and each having adjusting means therein including a saturable element capable of saturating upon receipt of a predetermined low number of input pulses accompanied by production of an output pulse and the resetting of the saturable element to an initial condition, a series of decade counters corresponding to the successive orders of a decimal number from low order to high and each having means therein including a saturable reactor capable of saturating upon receipt of ten input pulses accompanied by production of an output pulse and the resetting of the saturable element to an initial condition, the counters in the lowest order being coupled to the input terminal and the decade counter in each order being coupled to the counters in the next higher order, a two-condition switch interposed between the adjustable counter and decade counter in each of the orders so that upon receipt of the set number of pulses in the particular order the resulting output pulse from the adjustable counter in such order causes the switch to switch to its alternate condition to disable the adjustable counter in such order and to enable the decade counter in such order, the adjustable counter in the highest order being connected to the output terminal so that when a predetermined number of pulses has been received at the input terminal a pulse is produced at the output terminal.

3. In a counter capable of being set to produce an output pulse upon receipt of a predetermined high number of input pulses, the combination comprising an input terminal and an output terminal, a series of adjustable counters corresponding to the successive orders of a decimal number from low order to high and each having adjusting means therein including a saturable element capable of saturating upon receipt of a predetermined low number of input pulses accompanied by production of an output pulse and the resetting of the saturable element to an initial condition, a series of decade counters corresponding to the successive orders of a decimal number from low order to high and each having means therein including a saturable reactor capable of saturating upon receipt of ten input pulses accompanied by production of an output pulse and the resetting of the saturable element to an initial condition, the counters in the lowest order being coupled to the input terminal, and the decade counter in each order being coupled to the counters in the next higher order, a two-condition switch interposed between the adjustable counter and decade counter in each of the orders so that upon receipt of the set number of pulses in the particular order the resulting output pulse from the adjustable counter in such order causes the switch to switch to its alternate condition to disable the adjustable counter in such order and to enable the decade counter in such order, the adjustable counter in the highest order being connected to the output terminal so that when a predetermined number of pulses has been received at the input terminal a pulse is produced at the output terminal, and means coupling said output terminal to the two-condition switches to restore each of the switches to a condition wherein the associated adjustable counter is enabled and the associated decade counter is disabled for receipt, at the input terminal, of a subsequent series of pulses.

4. In a counter capable of being set to produce an output pulse upon receipt of a predetermined high number of input pulses, the combination comprising an input terminal and an output terminal, a series of adjustable counters corresponding to the successive orders of a decimal number from low order to high and each having adjusting means therein including a saturable element capable of saturating upon receipt of a predetermined low number of input pulses accompanied by production of an output pulse and the resetting of the saturable elements to an initial condition, a series of decade counters corresponding to the successive orders of a decimal number from lower order to high and each having means therein including a saturable reactor capable of saturation upon receipt of a set, constant number of input pulses accompanied by production of an output pulse and the resetting of the saturable element to an initial condition, the counters in the lowest order being coupled to the input terminal and the decade counter in each order being coupled to the counters in the next higher order, means including a bistable flip-flop interposed between the adjustable counter and the decade counter in each of the orders so that upon receipt of the predetermined number of pulses in the particular order the resulting output pulse from the adjustable counter in such order causes the flip-flop to be switched to its opposite condition to disable the adjustable counter in such order and to enable the decade counter in such order, the adjustable counter in the highest order being connected to the output terminal so that when a predetermined number of pulses have been received at the input terminal a pulse is produced at the output terminal.

5. In a counter capable of being set to produce an output pulse upon receipt of a predetermined high number of input pulses, the combination comprising an input terminal and an output terminal, a series of adjustable counters corresponding to the successive orders of a decimal number from low order to high and each having a saturable element capable of saturation upon receipt of a predetermined low number of input pulses accompanied by production of an output pulse and the resetting of the saturable element to an initial condition, means including a variable tapped winding on the saturable element for presetting the associated counter to provide an output pulse upon receipt of a selected number of input pulses, a series of decade counters corresponding to the successive orders of a decimal number from low order to high and each having means therein including a saturable reactor capable of saturating upon receipt of ten input pulses accompanied by production of an output pulse and the resetting of the saturable element to an initial condition, the counters in the lowest order being coupled to the input terminal and the decade counter in each order being coupled to the counters in the next higher order, a two-condition switch interposed between the adjustable counter and the decade counter in each of the orders so that upon receipt of the set number of pulses in the particular order the resulting output pulse from the adjustable counter in such order causes the switch to switch to its opposite condition to disable the adjustable counter in such order and to enable the decade counter in such order, the adjustable counter in the highest order being connected to the output terminal so that when a predetermined number of pulses have been received at the input terminal a pulse is produced at the output terminal.

References Cited in the file of this patent

UNITED STATES PATENTS

| | | |
|---|---|---|
| 2,558,447 | MacSorley | June 26, 1951 |
| 2,757,297 | Evans et al. | July 31, 1956 |
| 2,824,698 | Van Nice | Feb. 25, 1958 |
| 2,897,380 | Nietzert | July 28, 1959 |

OTHER REFERENCES

"A Predetermined Scaler Utilizing Transistors and Magnetic Cores," by Van Nice and Lyman, from "Proc. of the Nat'l Electronics Conf.," vol XI, pp. 859–869, Oct. 3, 4, 5, 1955.